US012715300B2

(12) United States Patent
Pettersson et al.

(10) Patent No.: US 12,715,300 B2
(45) Date of Patent: Aug. 25, 2026

(54) METHODS AND SYSTEM FOR CONTROLLING REGENERATIVE TORQUE

(71) Applicant: Ford Global Technologies, LLC, Dearborn, MI (US)

(72) Inventors: Lars Niklas Pettersson, Novi, MI (US); Matthew Johnson, Toledo, OH (US); Brendan Diamond, Grosse Pointe, MI (US); Keith Weston, Canton, MI (US); Andrew Lewandowski, Sterling Heights, MI (US); Andrew Niedert, New Hudson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 761 days.

(21) Appl. No.: 17/662,793

(22) Filed: May 10, 2022

(65) Prior Publication Data

US 2023/0364999 A1 Nov. 16, 2023

(51) Int. Cl.
*B60L 7/18* (2006.01)
*B60L 15/20* (2006.01)

(52) U.S. Cl.
CPC ............. *B60L 7/18* (2013.01); *B60L 15/2009* (2013.01); *B60L 2200/28* (2013.01); *B60L 2240/16* (2013.01); *B60L 2240/18* (2013.01)

(58) Field of Classification Search
CPC ...... B60L 7/18; B60L 15/2009; B60L 220/28; B60L 2240/16; B60L 2240/18
See application file for complete search history.

(56) References Cited

U.S. PATENT DOCUMENTS

| | | | | |
|---|---|---|---|---|
| 5,938,295 | A | 8/1999 | Stumpe et al. | |
| 8,602,142 | B2 | 12/2013 | Books et al. | |
| 8,924,120 | B2 | 12/2014 | Perkins | |
| 9,358,969 | B2 | 6/2016 | Yamazaki et al. | |
| 9,457,802 | B2 | 10/2016 | Ponziani | |
| 10,793,124 | B2 | 10/2020 | Zhao et al. | |
| 2006/0235575 | A1* | 10/2006 | Brown | B60W 40/101 701/1 |
| 2007/0018499 | A1* | 1/2007 | Kokubo | B60L 7/14 303/151 |
| 2009/0054202 | A1* | 2/2009 | Yamakado | B60K 6/52 477/6 |
| 2009/0318255 | A1* | 12/2009 | Kato | B60K 1/00 903/910 |
| 2011/0023772 | A1* | 2/2011 | Crombez | B60L 50/40 116/28 R |
| 2014/0350789 | A1* | 11/2014 | Anker | B62D 15/025 701/41 |
| 2017/0137021 | A1* | 5/2017 | Nefcy | B60W 20/14 |
| 2019/0111790 | A1 | 4/2019 | Crombez et al. | |
| 2019/0217709 | A1* | 7/2019 | Zhao | B60T 8/172 |
| 2019/0351895 | A1* | 11/2019 | Ben-Ari | B60W 30/02 |
| 2021/0053448 | A1 | 2/2021 | Beck et al. | |

(Continued)

*Primary Examiner* — Anne Marie Antonucci
*Assistant Examiner* — Luis G Del Valle
(74) *Attorney, Agent, or Firm* — McCoy Russell LLP

(57) ABSTRACT

Methods and systems are provided for adjusting regenerative braking in response to normal loads applied to each of a vehicle's wheels coupled to an electric machine. In one example, a regenerative braking torque for a wheel may be adjusted in response to a normal load that is applied to the wheel as wheel load changes during vehicle braking.

19 Claims, 10 Drawing Sheets

(56) References Cited

U.S. PATENT DOCUMENTS

| | | | | |
|---|---|---|---|---|
| 2021/0072147 | A1* | 3/2021 | Yang | G08G 1/096716 |
| 2021/0139008 | A1* | 5/2021 | DiGioacchino | B60T 8/1708 |
| 2021/0252976 | A1* | 8/2021 | Nahrwold | B60L 7/10 |
| 2022/0063365 | A1* | 3/2022 | Chetty | B60G 17/01908 |
| 2022/0118961 | A1* | 4/2022 | Brinkman | B60T 8/323 |
| 2022/0144058 | A1* | 5/2022 | Ben-Ari | F16D 1/10 |
| 2023/0077259 | A1* | 3/2023 | Katzourakis | B60W 60/001 |

* cited by examiner

Control System
14
Sensors
16
Actuators
81
TO 12
Lateral
pitch
Vertical
yaw
roll
Longitudinal

FIG. 2
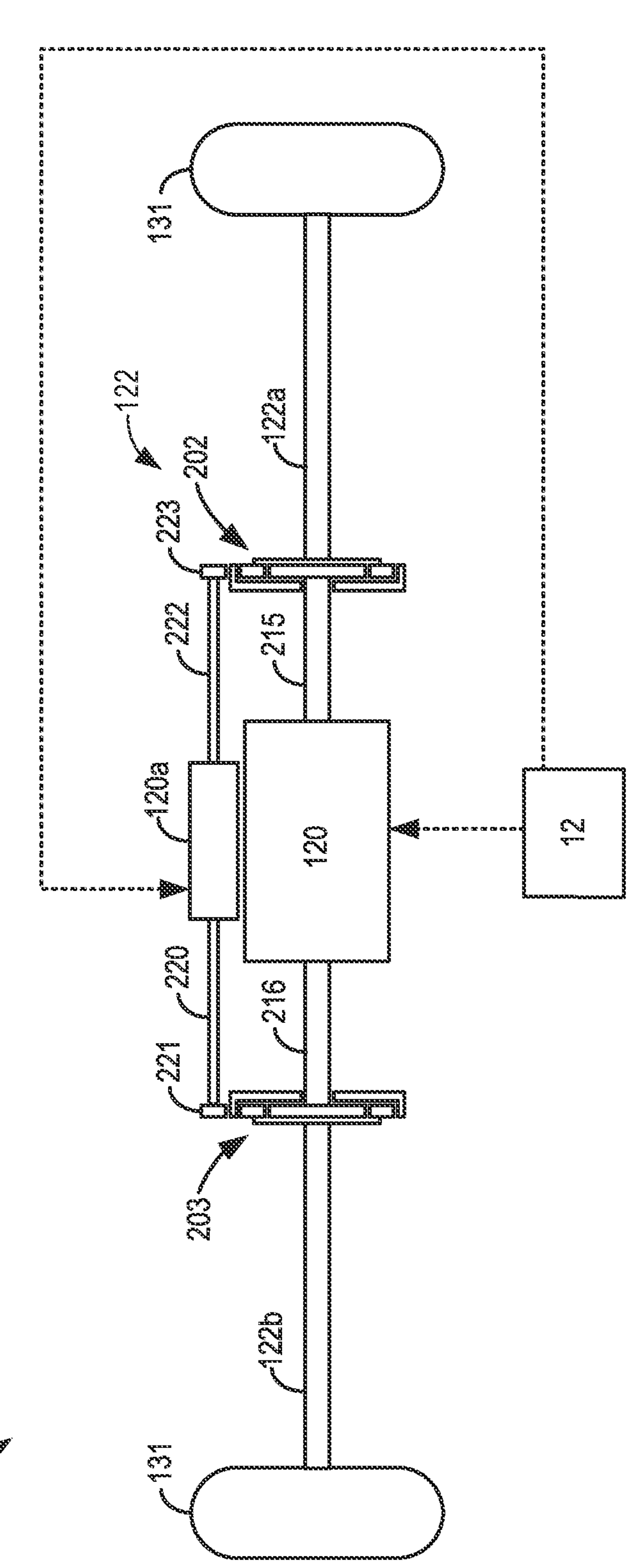
131
122
122a
202
223
222
215
120a
120
12
220
216
221
203
122b
131
200

100
110
111
121
130A
130B
131C
131D
322A
322B
322C
322D
347A
347B
347C
347D
158
195
102
156
157
192
194
132
138
139
112
TO 12
199
TO 12
152
175
19
15
17
18
150
151
180
182
184
Control System 14
12
165
166
167
168
81 Actuators
16 Sensors
yaw
roll
pitch
Lateral
Longitudinal
Vertical

FIG. 8
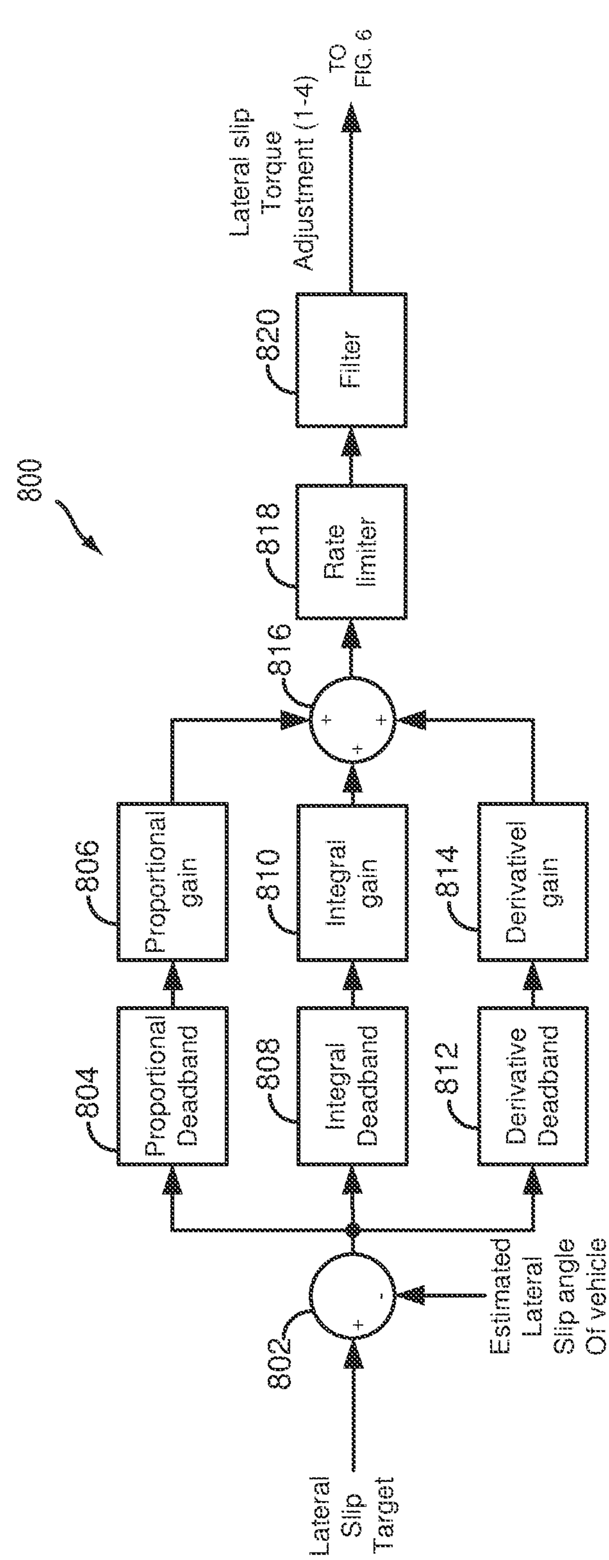

METHODS AND SYSTEM FOR CONTROLLING REGENERATIVE TORQUE

FIELD

The present description relates generally to methods and systems for controlling torque distribution between wheels of a vehicle. The methods and systems may be particularly useful for vehicles that are electrically propelled.

BACKGROUND/SUMMARY

Hybrid vehicles and electric vehicles may utilize regenerative braking to recapture energy and to slow a vehicle. In particular, electric machines may convert torque from the vehicle's wheels into electric charge and the electric charge may be stored in a battery. An amount of regenerative braking that is available to a vehicle may be a function of vehicle performance attributes and limitations of the vehicle's electrical system. However, there may be instances when it may be desirable to provide more regenerative braking capacity so that an available driving range of a vehicle may be greater.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 is a detailed view of an axle that includes a propulsive force electric machine, a torque vectoring electric machine, and gear sets;

FIGS. 6-10 show flowcharts of a method for optimizing regenerative braking.

DETAILED DESCRIPTION

Figure 1:
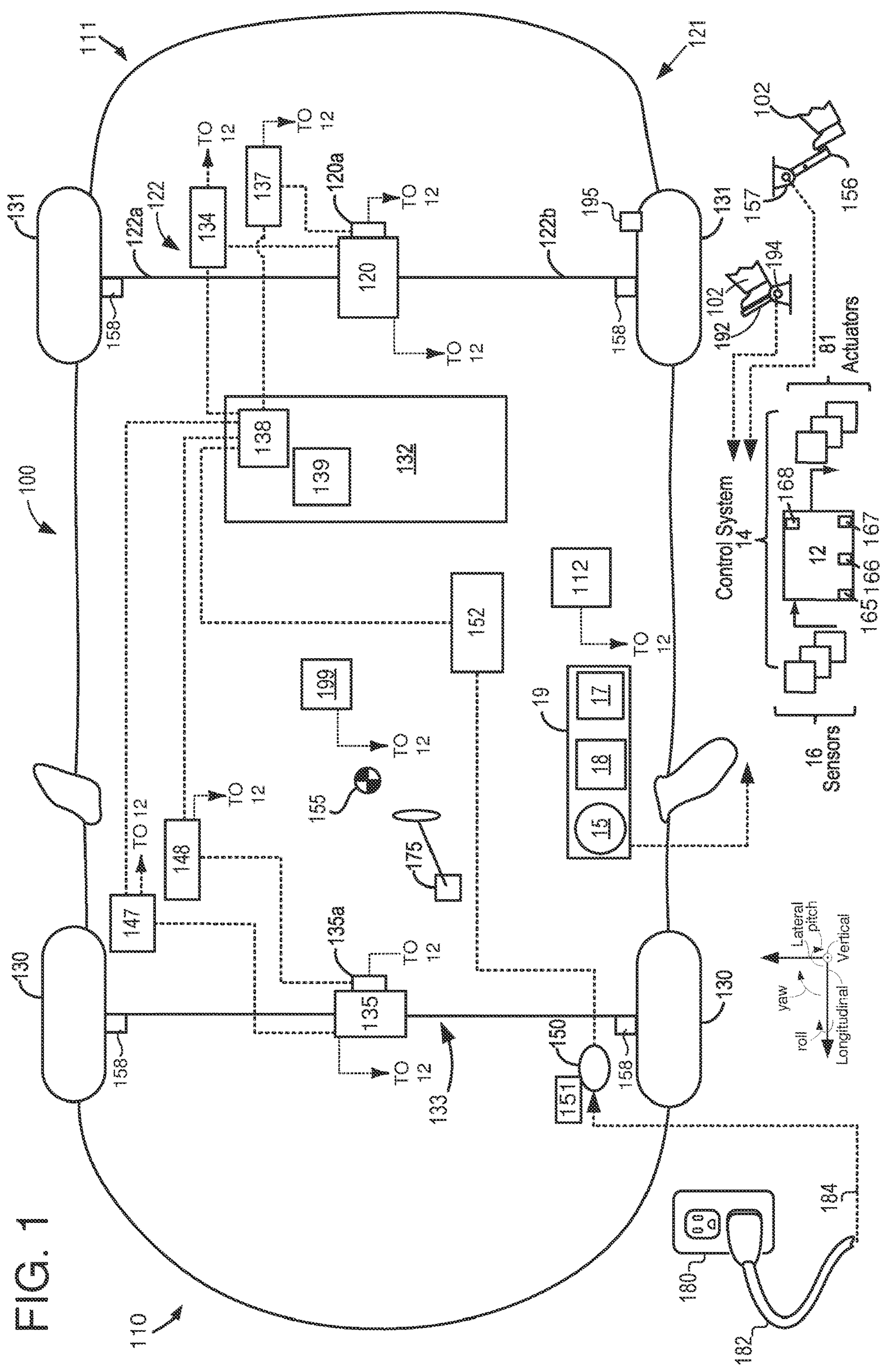
FIG. 1 is a schematic diagram of a first vehicle driveline.

The following description relates to systems and methods for operating a vehicle with regenerative braking. FIGS. 1-4 show example vehicle drivelines and driveline components that include one or more electrical propulsion sources. The electrical propulsion sources may operate in a generator mode during vehicle braking to convert the vehicle's kinetic energy into electrical energy. One example braking sequence where trailer braking gain is adjusted is shown in FIG. 5. FIGS. 6-10 show flowcharts of a method for operating a vehicle with regenerative braking.

A vehicle may be configured with regenerative braking to capture energy that was used to increase the vehicle's kinetic energy. Nevertheless, the amount of regenerative braking for a passenger car may be limited by the car's performance attributes and nominal vehicle operating conditions, such as a single vehicle occupant and unloaded. Limiting the regenerative braking capacity for a passenger car may not significantly affect the car's driving range. However, limiting a vehicle's regenerative braking capacity may have a more significant effect on a vehicle's driving range is the vehicle is fully loaded and towing a trailer. Therefore, it may be desirable to provide a way of adjusting an amount of regenerative braking applied to a wheel according to normal load placed upon the wheel so that a greater amount of the vehicle's kinetic energy may be captured and stored as electric charge.

The inventors herein have recognized the above-mentioned issues and have developed a vehicle operating method, comprising: adjusting a torque of an electric machine via a controller in response to an estimated coefficient of friction between a tire and a road, a normal load on a wheel, a vertical rate of speed change of a vehicle, a longitudinal rate of speed change of the vehicle, and a lateral rate of speed change of the vehicle, where the tire is coupled to the wheel.

By adjusting a torque of an electric machine in response to a normal load that is applied to a wheel and other control parameters, it may be possible to provide the technical result of increasing an amount of energy captured via an electric machine during regenerative braking. In particular, the torque of an electric machine that is available for converting a vehicle's kinetic energy into electric charge may be increased when a normal load on a wheel increases. Additionally, the torque of the electric machine that is available for converting the vehicle's kinetic energy into electric charge may be decreased when the normal load on the wheel decreases.

The present description may provide several advantages. In particular, the approach provides torque control of one or more electric machines during regenerative braking to improve conversion of a vehicle's kinetic energy into electric charge. In addition, the approach may adjust trailer braking during regenerative braking so that more of a trailer's kinetic energy may be converted to electric charge during regenerative braking. Further, the regenerative braking for each wheel that is coupled to an electric machine may be adjusted to compensate for lateral vehicle slip, longitudinal vehicle slip, and vehicle stability.

FIG. 1 illustrates an example vehicle propulsion system 100 for vehicle 121. Throughout the description of FIG. 1, mechanical connections between various components are illustrated as solid lines, whereas electrical connections between various components are illustrated as dashed lines. Vehicle propulsion system 100 is shown with a first electric machine (e.g., a propulsive force electric machine) 120 and a second electric machine (e.g., a propulsive force electric machine) 135 for propelling vehicle 121. However, in other examples, vehicle 121 may include only one electrical machine for providing propulsive force. Electric machine 120 and electric machine 135 are controlled via controller 12. The controller 12 receives signals from the various sensors shown in FIGS. 1 and 2. In addition, controller 12 employs the actuators shown in FIGS. 1 and 2 to adjust driveline operation based on the received signals and instructions stored in memory of controller 12. In some examples, the vehicle propulsion system 100 may include an internal combustion engine (not shown). Vehicle 121 includes a front side or front 110 and a rear side or rear 111.

Vehicle propulsion system 100 has a front axle 133 and a rear axle 122. In some examples, rear axle may comprise two half shafts, for example first half shaft 122*a*, and second half shaft 122*b*. Vehicle propulsion system 100 further includes front wheels 130 and rear wheels 131. In this example, front wheels 130 and/or rear wheels 131 may be driven via electrical propulsion sources. The rear axle 122 is coupled to electric machine 120. Electric machine 120 is shown incorporated into axle 122 and electric machine 135 is shown incorporated into front axle 133.

Electric machines 120, 120*a*, 135, and 135*a* may receive electrical power from onboard electrical energy storage device 132. Furthermore, electric machines 120 and 135 may provide a generator function to convert the vehicle's kinetic energy into electrical energy, where the electrical energy may be stored at electric energy storage device 132 for later use by the electric machine 120 and/or 135. Electric machines 120 and 135 may provide a regeneration or negative torque that opposes rotation of wheels 130 and 131 when electric machines 120 and 135 are operated in the generator mode. A first inverter system controller (ISC1) 134 may convert alternating current generated by electric machine 120 to direct current for storage at the electric energy storage device 132 and vice versa. A second inverter system controller (ISC2) 147 may convert alternating current generated by electric machine 135 to direct current for storage at the electric energy storage device 132 and vice versa. A third inverter system controller (ISC3) 137 may convert DC current from electric energy storage device 132 to an alternating current used by electric machine 120*a*. A fourth inverter system controller (ISC4) 148 may convert DC current from electric energy storage device 132 to an alternating current used by electric machine 135*a*. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 120, torque vectoring electric machine 120*a*, energy storage device 132, electric machine 135, torque vectoring electric machine 135*a*, etc. Control system 14 may receive sensory feedback information from one or more of electric machine 135, electric machine 120, energy storage device 132, etc. Further, control system 14 may send control signals to one or more of electric machine 135, torque vectoring electric machine 135*a*, electric machine 120, torque vectoring electric machine 120*a*, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with driver demand pedal 192. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in electric vehicle, whereby electrical energy may be supplied to energy storage device 132 from power source 180 via an electrical energy transmission cable 182. During a recharging operation of energy storage device 132 from power source 180, electrical energy transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132.

While the vehicle propulsion system is operated to propel the vehicle, electrical energy transmission cable 182 may be disconnected between power source 180 and energy storage device 132. Control system 14 may identify and/or control the amount of electrical energy stored at the energy storage device, which may be referred to as the state of charge (SOC).

In other examples, electrical energy transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it may be appreciated that any suitable approach may be used for recharging energy storage device 132 from a power source that does not comprise part of the vehicle. In this way, electric machine 120 and electric machine 135 may propel the vehicle by utilizing a stationary electric power source.

Electric energy storage device 132 includes an electric energy storage device controller 139. Electric energy storage device controller 139 may provide charge balancing between energy storage element (e.g., battery cells) and communication with other vehicle controllers (e.g., controller 12).

Vehicle propulsion system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral motion, and longitudinal motion are as indicated. As one example, inertial sensors 199 may couple to the controller 12. The control system may adjust electric machine output and/or the torque vectoring electric machines to increase vehicle stability in response to sensor (s) 199. The vehicle's center of gravity is indicated at 155.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor. Additionally, one or more ride height sensors 158 may be supplied at each wheel that is coupled to an electric machine to determine ride height and vehicle loading.

Vehicle 121 may also include a trailer brake controller 112. In some examples, trailer brake controller 112 may supply an amount of electric current to trailer brakes that is in proportion to an application amount of brake pedal 156. For example, the electric current that is supplied to the trailer brakes may be defined via the following equation:

$$I_T = K \cdot B_D$$

where $I_T$ is the electric current amount supplied to trailer brakes, K is a scalar gain (e.g., real number), and $B_D$ is the brake demand which may be determined from brake pedal position. In other examples, a maximum amount of electric current that may be supplied to electric brakes may be selected via a human user. The trailer brake gain or the maximum amount of electric current may be adjusted via human operator 102 via operator interface 15. Alternatively, or in addition, trailer brake gain or maximum trailer brake electric current may be adjusted automatically by controller 12 communicating a change in trailer brake gain or maximum electric current to trailer brake controller 112. In one example, trailer brake electric current may be set to ten levels not including off (e.g., 0-10). If the trailer brake current is set to 5 (e.g., 4 amperes, where 8 amperes is maximum current) and the brake pedal is gradually applied, electric current supplied to the trailer brakes may gradually increases proportionately with the application of the brake pedal until the amount of electric current that is represented by the value 5 is delivered. Once the value of electric current that is represented by the value of 5 is delivered, no additional electric current is delivered to the trailer brakes.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include wheel speed sensor(s) 195 and inertial sensors 199, etc. In some examples, steering angle sensor 175, sensors associated with electric machine 135 and electric machine 120, etc., may communicate information to controller 12, regarding various states of electric machine operation.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 135 and electric machine 120) based on an operator input. Various examples of the operator interface 15 may include interfaces that require a physical apparatus, such as an active key, that may be inserted into the operator interface 15 to activate the electric machines 135 and 120 and turn on the vehicle, or may be removed to deactivate the electric machines 135 and 120, thereby turning off the vehicle. Other examples may include a passive key that is communicatively coupled to the operator interface 15. The passive key may be configured as an electronic key fob or a smart key that does not have to be inserted or removed from the operator interface 15 to operate the vehicle. Rather, the passive key may need to be located inside or proximate to the vehicle (e.g., within a threshold distance of the vehicle). Still other examples may additionally or optionally use a start/stop button that is manually pressed by the operator to start or shut down the electric machines 135 and 120 to turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

FIG. 2 is a detailed schematic view of an axle system 200 that includes rear axle 122. Front axle 133 may be configured similarly in four wheel drive vehicles. The axle shown in FIG. 2 includes electric machine 120 of FIG. 1. Electric machine 120 is coupled to shaft **122*b* via shaft 216 and open differential or planetary gear set 203. Electric machine 120 is also mechanically coupled to shaft 122*a* via shaft 215 and open differential or planetary gear set 202. Torque vectoring electric machine 120*a* is arranged in parallel with electric machine 120 and torque vectoring electric machine 120*a* is mechanically coupled to open differentials or planetary gear sets 202 and 203 via shafts 220 and 222. Open differentials or planetary gear sets 202 and 203 are coupled to shafts 220 and 222 via gears 221 and 223. Controller 12 may command propulsive force electric machine 120 in a motor or a generator mode. Controller 12 may also command torque vectoring electric machine 120*a* in a motor mode to rotate a ring gear in an opposite direction of planet gears to increase torque delivered to one of drive shafts 122*a* and 122*b* and to reduce torque delivered to the other of drive shafts 122*a* and 122*b***.

Figure 3:
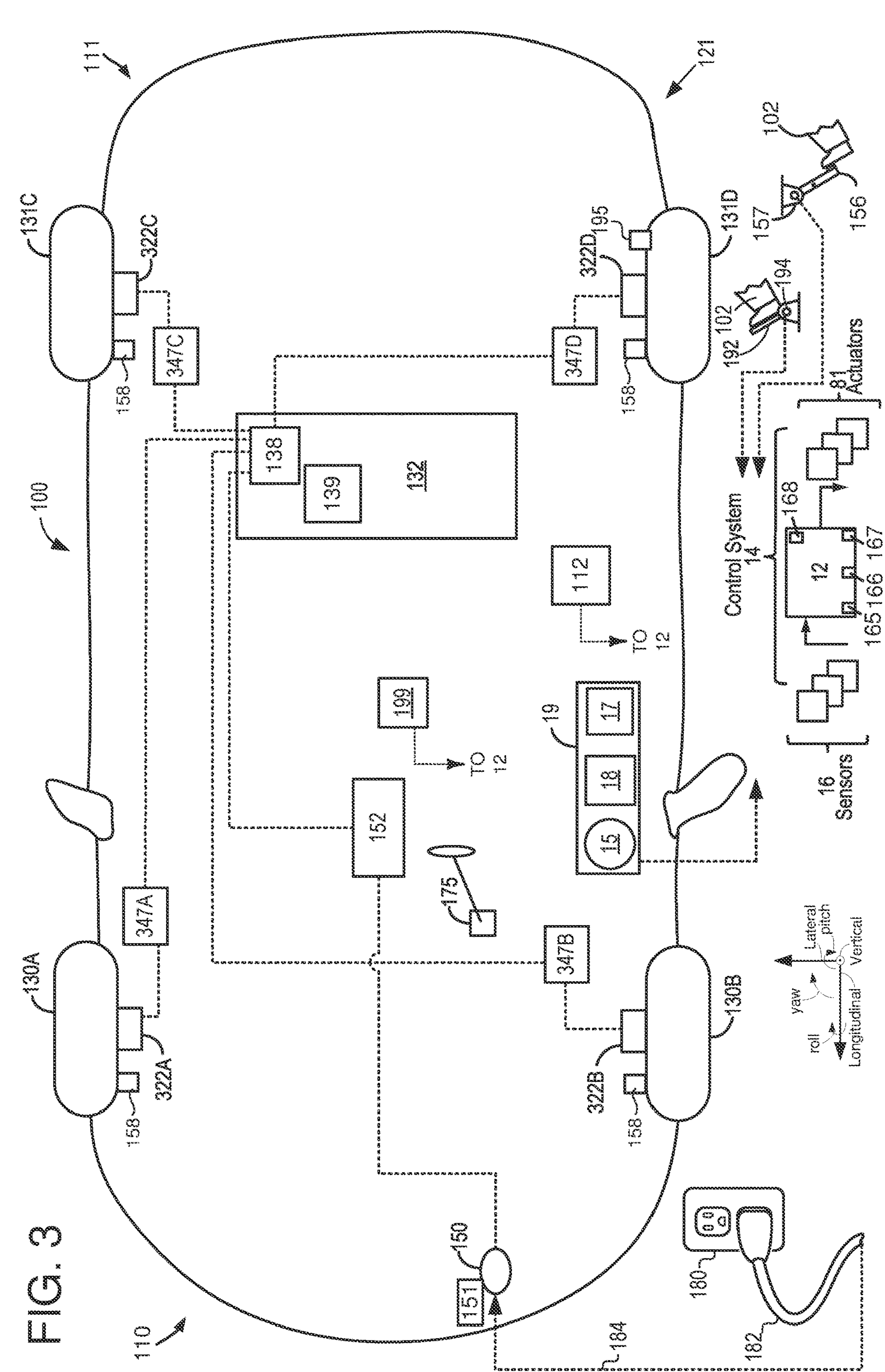
FIG. 3 is a schematic diagram of a second vehicle driveline.

FIG. 3 illustrates an alternative example vehicle propulsion system 100 for vehicle 121. The components of vehicle 121 that are the same as components of vehicle 121 shown in FIG. 1 are labeled with a same numbering convention. For example, front left wheel 130A and front right wheel 130B are indicated as 130 in FIGS. 1 and 3. New components are indicated with new numbers.

In this example, an electric machine is coupled to each wheel and the electric machines may be operated independently. In particular, front right electric machine 322A may provide torque to front left wheel 130A. Front left electric machine 322B may provide torque to front right wheel 130B. Rear right electric machine 322C may provide torque to rear right wheel 131C. Rear left electric machine 322D may provide torque to rear left wheel 131D.

Inverter 347A may convert alternating current generated by front right electric machine 322A to direct current for storage at the electric energy storage device 132 and vice versa. Inverter 347B may convert alternating current generated by front left electric machine 322B to direct current for storage at the electric energy storage device 132 and vice versa. Inverter 347C may convert alternating current generated by rear right electric machine 322C to direct current for storage at the electric energy storage device 132 and vice versa. Inverter 347D may convert alternating current generated by rear left electric machine 322D to direct current for storage at the electric energy storage device 132 and vice versa. Controller 12 may control inverters 347A-347D and electric machines 322A-322D individually to operate in speed and torque control modes.

Figure 4:
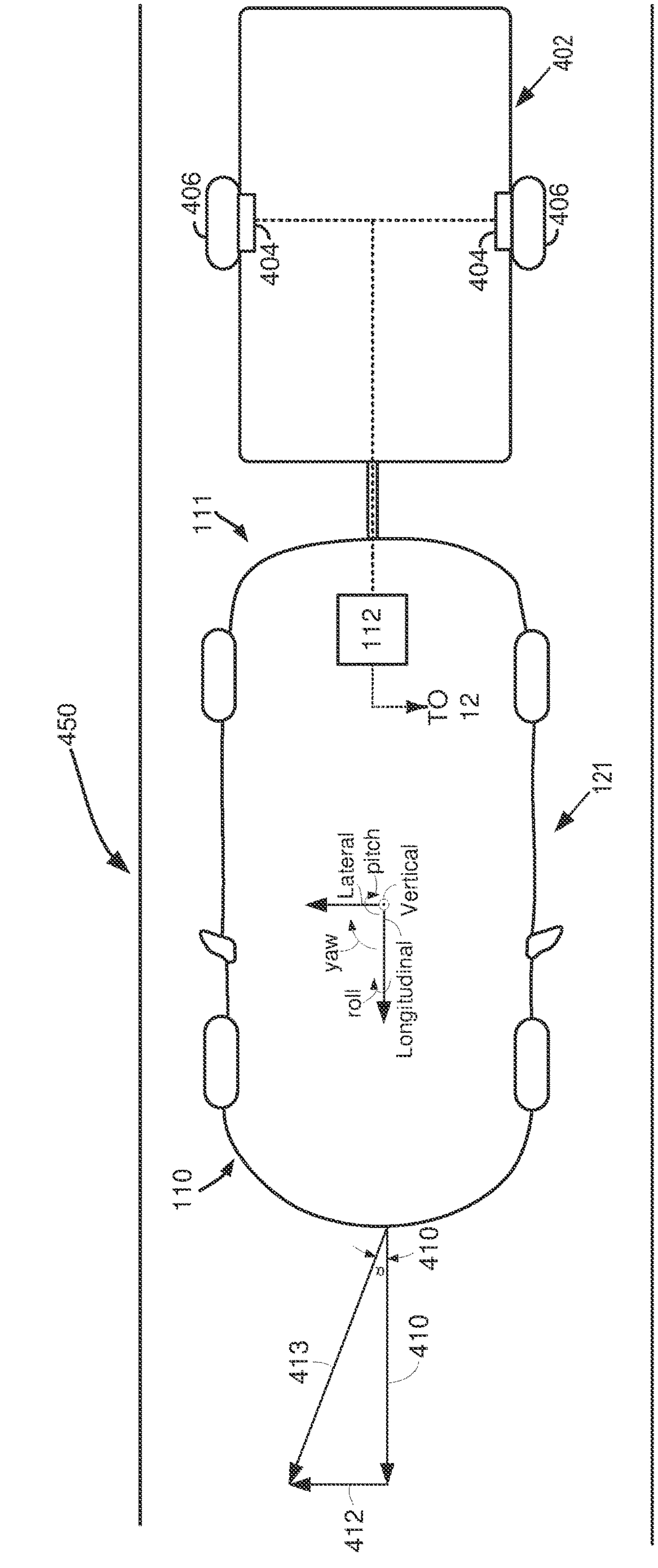
FIG. 4 is a plan view of an example vehicle and trailer.
Figure 5:
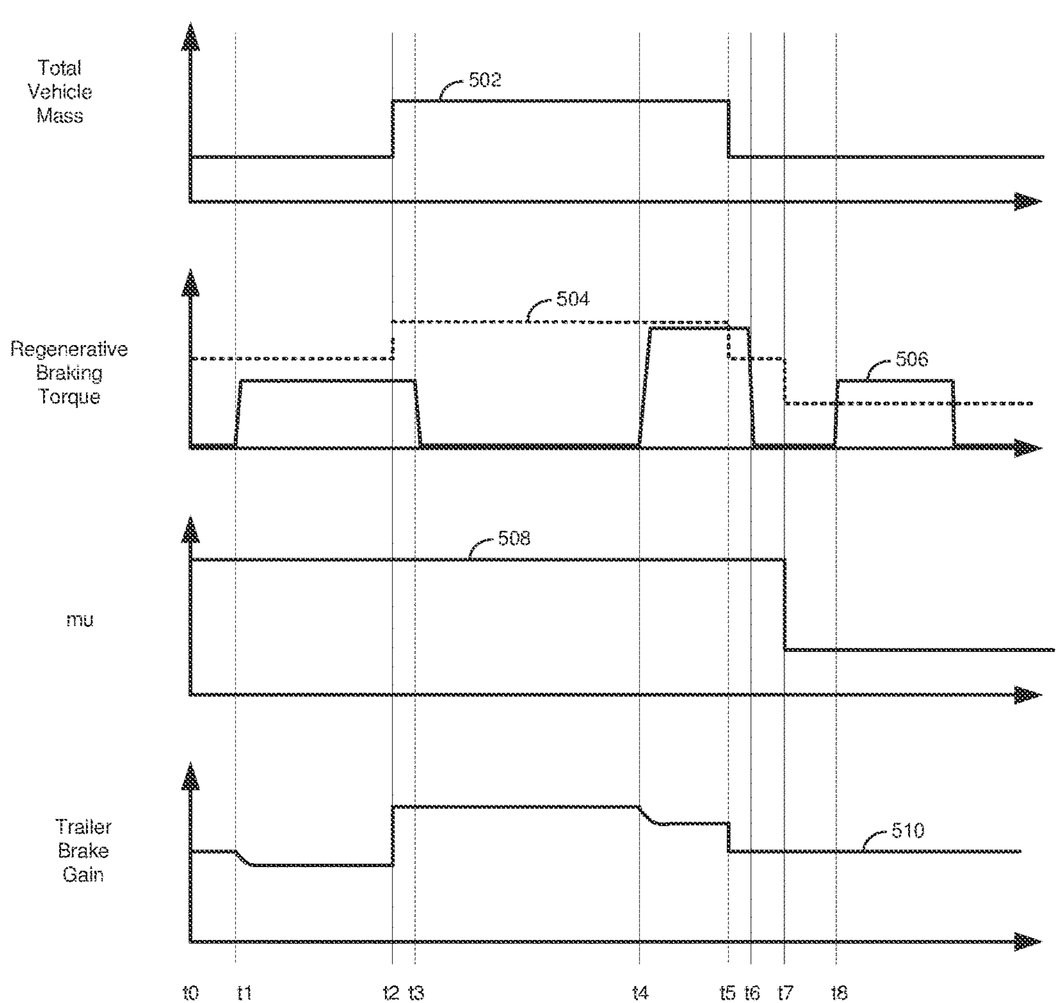
FIG. 5 shows an example braking sequence according to the method of FIGS. 6-10.

Referring now to FIG. 4, a plan view of trailer 402 coupled to vehicle 121 is shown. Vehicle 121 includes a trailer brake controller 112 that is electrically coupled to trailer brakes 404 (e.g., electrically actuated brakes). Trailer brakes 404 may slow trailer wheels 406 when electric current is supplied to trailer brakes 404.

FIG. 4 also shows a vehicle lateral slip angle α. Vehicle 121 is shown with a forward velocity vector 410 that shows the direction that vehicle 121 is pointing. Vehicle 121 is also shown with a lateral velocity vector 412. The vehicle slip angle is the angle 414 between the vehicle's actual direction 413 (e.g., the sum of the forward velocity vector 410 and the lateral velocity vector 412) and the direction that the vehicle is pointing (e.g., the same direction as the forward velocity vector 410). The longitudinal slip of vehicle 121 may be described as a percentage difference between a speed of a wheel and speed of an axle or of vehicle 121 with respect to a road or the ground 450.

Thus, the system of FIGS. 1-4 provides for a vehicle system, comprising: an electric machine coupled to a wheel; and a controller including executable instructions stored in non-transitory memory to operate the electric machine in a regenerative braking mode and to adjust a regenerative braking torque generated via the electric machine in response to a sum of torque adjustment based on a normal load on a wheel and a torque adjustment that is a sum of a torque adjustment generated via a lateral slip controller, a torque adjustment generated via a longitudinal slip controller, and a torque adjustment generated via a vehicle stability controller. The vehicle system further comprises additional instructions to adjust a trailer brake gain or a maximum trailer brake current amount in response to a difference between an available amount of regenerative braking and a requested amount of regenerative braking. The vehicle system further comprises additional instructions to adjust the trailer brake gain or a maximum trailer brake current amount in response to output of at least one of a longitudinal slip controller, a lateral slip controller, and a vehicle stability controller. The vehicle system includes where adjusting the trailer brake gain or maximum trailer brake current amount includes decreasing the trailer brake gain or the maximum trailer brake current amount. The vehicle system further comprises additional instructions to adjust an estimate of the normal load on the wheel based on an estimated center of gravity height. The vehicle system further comprises additional instructions to adjust the estimate of the normal load on the wheel based on an estimated longitudinal weight transfer value. The vehicle system further comprises additional instructions to adjust the estimate of the normal load on the wheel based on an estimated lateral weight transfer value.

Referring now to FIG. 5, a prophetic operating sequence according to the method of FIGS. 6-10 is shown. The vehicle operating sequence shown in FIG. 5 may be provided via the method of FIGS. 6-10 in cooperation with the system shown in FIGS. 1-4. The plots shown in FIG. 5 occur at the same time and are aligned in time.

The first plot from the top of FIG. 5 is a plot of total vehicle mass versus time. The vertical axis represents the total vehicle mass and the total vehicle increases in the direction of the vertical axis arrow. The horizontal axis represents time and time increases from the left side of the figure to the right side of the figure. Trace 502 represents the total vehicle mass.

The second plot from the top of FIG. 5 is a plot of regenerative braking torque versus time. The vertical axis represents the regenerative braking torque and the regenerative braking torque increases in the direction of the vertical axis arrow. The horizontal axis represents time and time increases from the left side of the figure to the right side of the figure. Trace 504 represents a sum of regenerative braking torque for all wheels that are coupled to an electric machine that is available for braking the vehicle. Trace 506 represents a driver demand braking torque.

The third plot from the top of FIG. 5 is a plot of a coefficient of friction between vehicle wheels or tires and a road surface versus time. The vertical axis represents the coefficient of friction value and the coefficient of friction value increases in the direction of the vertical axis arrow. The horizontal axis represents time and time increases from the left side of the figure to the right side of the figure. Trace 508 represents the coefficient of friction value.

The fourth plot from the top of FIG. 5 is a plot of trailer brake gain (e.g., a maximum amount of electric current that is available to operate electric trailer brakes) versus time. The vertical axis represents a trailer brake gain amount and the trailer brake gain amount increases in the direction of the vertical axis arrow. The horizontal axis represents time and time increases from the left side of the figure to the right side of the figure. Trace 510 represents the trailer brake gain amount.

At time t0, the total vehicle mass is at a lower middle level and the sum of regenerative braking torque that is available for braking the vehicle is at a middle level and the driver demand braking amount is zero. The coefficient of friction is high indicating a good surface for stopping a vehicle. The trailer brake gain is set to a middle level by the vehicle's operator.

At time t1, the vehicle's brake pedal is applied (not shown) as indicated by the driver demand braking torque increasing. Since the brake pedal is applied and since the driver demand brake torque is less than the sum of brake torque available for braking the vehicle, the trailer brake gain is automatically reduced via a vehicle controller. Reducing the trailer brake gain allows an increased amount of the trailer's kinetic energy to be converted into electric energy via electric machines in the vehicle's powertrain. As such, the vehicle's driving range may be increased.

At time t2, the vehicle is stopped and mass is added to the vehicle. The vehicle's driver also increases the trailer brake gain so that additional electric current may be available to stop the trailer when the vehicle's brakes are applied. The sum of regenerative braking that is available is increased since additional mass over vehicle wheels may reduce a possibility of wheel slip. The coefficient of friction is unchanged.

At time t3, the driver demand brake pedal (not shown) is released and the driver demand brake torque is reduced. The total vehicle mass is unchanged and the sum of regenerative braking torque that is available is unchanged. The coefficient of friction is unchanged.

At time t4, the driver demand brake torque is increased via applying the brake pedal (not shown) and the trailer brake gain is reduced in response to the sum of regenerative braking torque that is available being greater than the driver demand brake torque. The coefficient of friction is unchanged.

At time t5, the total vehicle mass is reduced via removing mass from the vehicle and the vehicle's driver (not shown) reduces the trailer brake gain manually. The sum of regenerative braking torque that is available to the vehicle is reduced in response to the lower vehicle mass. The coefficient of friction is unchanged.

At time t6, the brake pedal is released (not shown) and the driver demand brake torque is reduced. The sum of regenerative braking torque that is available for slowing the vehicle is unchanged and the total vehicle mass is unchanged. The coefficient of friction is unchanged and the trailer brake gain is unchanged.

At time t7, the coefficient of friction is decreased as the vehicle moves to a different road surface. The total vehicle mass is unchanged, but the sum of regenerative braking torque that is available to stop the vehicle is reduced so that the possibility of wheel slip may be reduced during vehicle braking. The driver demand braking amount is zero and the trailer braking gain is unchanged by the driver.

At time t8, the brake pedal (not shown) is applied and the driver demand brake torque increases. The total vehicle mass is unchanged and the sum of braking torque that is available to slow the vehicle is unchanged. The coefficient of friction is unchanged and the trailer brake gain is also unchanged. The trailer brake gain is not reduced because the driver demand braking amount is greater than the sum of regenerative braking torque that is available to slow the vehicle.

In this way, trailer brake gain may be adjusted responsive to driver demand braking request and a sum of regenerative braking torque that is available to slow the vehicle. Further, the sum of regenerative braking torque that is available to slow the vehicle may be adjusted according to the total vehicle mass and a coefficient of friction between vehicle tires and a road surface.

Figure 6:
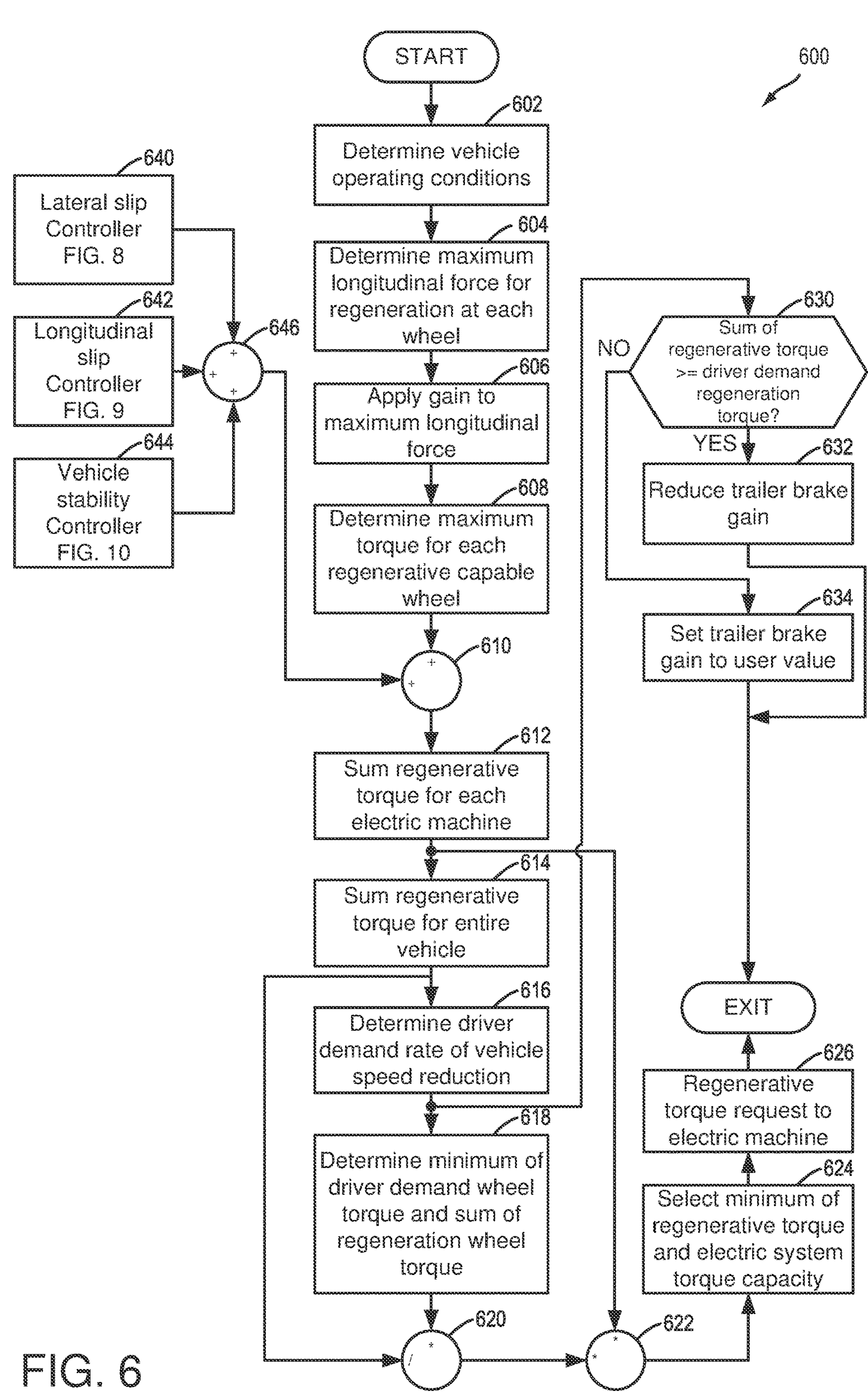

Turning now to FIG. 6, an example method 600 for operating a vehicle is shown. At least portions of method 600 may be included in and cooperate with a system as shown in FIGS. 1-4 as executable instructions stored in non-transitory memory. The method of FIG. 6 may cause the controller to operate actuators in the real world and receive data and signals from sensors described herein when the method is realized as executable instructions stored in controller memory. Method 600 may work in cooperation with the methods described in FIGS. 7-10. Method 600 may be applied to each vehicle wheel that participates in regenerative braking to provide individual braking torque for each wheel that is coupled to an electric machine.

At 602, method 600 determines vehicle operating conditions. Vehicle operating conditions may include, but are not limited to estimating normal loads on each wheel that is coupled to an electric machine as described in the method of FIG. 7, estimating a coefficient of friction between tires and a road surface (e.g., μ–mu), wheel speeds, vehicle yaw rate, lateral and longitudinal rates of vehicle speed change, vehicle lateral slip angle, vehicle reference speed, and a vehicle stability state. Method 600 may determine or estimate the various operating conditions based on output of sensors described herein. For example, mu may be estimated by referencing a base mu estimate that is stored in controller memory. The base mu estimate may be lowered or increased a predetermined amount in response to wheel slip and driver demand wheel torque. Wheel slip may be determined based on a difference between a vehicle reference speed and a wheel speed. Method 600 proceeds to 604.

At 604, method 600 estimates a maximum longitudinal force for each wheel that may participate in regenerative braking. In one example, method 600 may determine a maximum force to slow a wheel during regenerative braking via the following equation:

$$F_{Reg}=\mu\cdot N_{wl}\cdot A_z-\sqrt{(V_m\cdot A_x)^2+(V_m\cdot A_y)^2}$$

where $F_{Reg}$ is the maximum regenerative braking force for a wheel, μ is a coefficient of friction between a tire of the wheel and a road or traveling surface, $N_{wl}$ is a normal load on the wheel (e.g., as determined via method 700), $A_z$ is a vertical rate of speed change for the vehicle, $V_m$ is the vehicle mass, $A_x$ is a longitudinal rate of speed change for the vehicle, and $A_y$ is a lateral rate of speed change for the vehicle. Method 600 proceeds to 606.

At 606, method 600 applies a gain to the maximum longitudinal force. The gain (e.g., a scalar real number) may be applied to the maximum longitudinal force that may be applied to each wheel for regenerative braking according to the following equation:

$$F_{RegGa}=G_1\cdot F_{Reg}$$

where FRegGa is the gain adjusted maximum longitudinal force that may be applied to a wheel during regenerative braking, $G_1$ is the regenerative braking gain value, and $F_{Reg}$ is the maximum regenerative braking force that may be applied to a wheel during regenerative braking. Method 600 proceeds to 608.

At 608, method 600 determines a maximum braking torque that may be applied to a wheel during regenerative braking. In one example, the maximum regenerative braking torque may be determined via the following equation:

$$T_{MReg}=F_{RegGa}\cdot R_w$$

where $T_{MReg}$ is the maximum regenerative braking torque for a wheel during regenerative braking, $F_{RegGa}$ is a gain adjusted maximum longitudinal force that may be applied to the wheel that is participating in regenerative braking, and $R_w$ is a tire radius of the wheel that is participating in regenerative braking. Method 600 proceeds to summing junction 610.

At summing junction 610, torque adjustments from the longitudinal slip controller, the lateral slip controller, and the vehicle stability controller are added to the maximum regenerative braking torque for the wheel during regenerative braking. The result is a regenerative braking torque for a wheel that has been compensated for vehicle dynamics. The result is delivered to 612.

At 640, method 600 determines a wheel torque adjustment for a wheel according to output of a lateral slip controller. The wheel torque adjustment may be provided as mentioned in the description of FIG. 8. The wheel torque adjustment is delivered to summing junction 646.

At 642, method 600 determines a wheel torque adjustment for a wheel according to output of a longitudinal slip controller. The wheel torque adjustment may be provided as mentioned in the description of FIG. 9. The wheel torque adjustment is delivered to summing junction 646.

At 644, method 600 determines a wheel torque adjustment for a wheel according to output of a vehicle stability controller. The wheel torque adjustment may be provided as mentioned in the description of FIG. 10. The wheel torque adjustment is delivered to summing junction 646. Summing junction 646 adds the lateral, longitudinal, and vehicle stability wheel torque adjustments for the wheel that is participating in regenerative braking and delivers the result to summing junction 610.

At 612, method 600 sums the regenerative braking torques for each electric machine. For example, if an electric machine is coupled solely to a single wheel, method 600 assigns the output of summing junction 610 for the single wheel to the electric machine. However, if an electric machine is coupled to two wheels that participate in regenerative braking, method 600 sums the torque that is output from summing junction 610 for each wheel and assigns the summed torque to the one electric machine. Method 600 proceeds to 614 and 622.

At 614, method 600 sums the regenerative torques for each electric machine. For example, if the vehicle includes two electric machines, the torque for the two electric machines determined at 612 is added together to generate a total regen torque for the vehicle. However, for vehicle that include only one electric machine for providing regenerative braking torque, the output of the one electric machine is output to 616 and 620.

At 616, method determines a driver demand rate of vehicle speed reduction and converts the driver demand rate of vehicle speed reduction into a driver demand wheel torque. The driver demand wheel torque may be determined via the following equation:

$$T_{DDwhl}=A_{DD}\cdot V_m\cdot R_w$$

where $T_{DDwhl}$ is the driver demand wheel torque, $A_{DD}$ is the driver requested rate of vehicle speed change, and $R_w$ is the tire radius. Method 600 proceeds to 618 and 630.

At 618, method 600 determines a minimum of the driver demand wheel torque determined at 616 and the sum of regenerative wheel torque determined at 614. Method 600 outputs the minimum value to junction 620. The minimum may be expressed via the following equation:

$$T_{VST}=\min(T_{DDwhl}, T_{sum})$$

where $T_{VST}$ is the total torque for stopping the vehicle, min is a function that returns a minimum of argument arg1 and of argument arg2, where arg1=$T_{DDwhl}$ and arg2=$T_{sum}$, and where Tsum is the sum of electric machine torques determined at 614. Method 600 proceeds to 620.

At junction 620, method 600 divides the output of block 618 by the output of block 614 to determine a fraction of the total amount of requested torque to stop the vehicle that is allocated to a particular wheel and electric machine that is coupled to the wheel. Junction 620 outputs the fraction to junction 622 where it is multiplied by the regenerative torque for an individual electric machine (e.g., output of block 612). Junction 622 outputs a regenerative braking torque for a particular electric machine. Regenerative braking torque for the remaining electric machines in the powertrain is determined in a similar way. Thus, method 600 determines an ideal or desired distribution of the amount of regeneration torque that the vehicle is presently capable of delivering for each wheel and scales the amount of regenerative braking torque for each wheel to meet the driver demanded braking amount. Method 600 proceeds to 624.

At 624, method 600 selects a minimum value from the output of junction 622 and an electric system torque capacity. The electric system torque capacity may be a function of torque that may be generated via the electric machine, torque that the battery may support, and torque that the inverter and other components of the electric system may support. The minimum torque may be expressed via the following equation:

$$T_{EMD}=\min(T_{VST}, T_{Esys})$$

where $T_{VST}$ is the total torque for stopping the vehicle, min is a function that returns a minimum of argument arg1 and of argument arg2, where arg1=$T_{VST}$ and arg2=$T_{Esys}$, $T_{Esys}$ is a maximum torque that may be generated according to limitations of the vehicle's electric system, and where $T_{EMD}$ is the final regenerative braking torque demand for an individual electric machine in the vehicle powertrain. Method 600 proceeds to 626.

At 626, method 600 commands an electric machine that is coupled to the particular wheel to provide or generate the final regenerative braking torque demand $T_{EMD}$. In one example, method 600 may request that an inverter operate to provide or generate the final regenerative braking torque in conjunction with an electric machine. The regenerative braking torque may oppose vehicle and trailer motion, thereby slowing the vehicle and the trailer. Method 600 proceeds to exit.

At 630, method 600 judges if the brake pedal is applied and the sum of the regenerative braking torque (e.g., output of block 614) is greater than or equal to the driver demand regenerative braking torque (e.g., output of block 616. If so, the answer is yes and method 600 proceeds to 632. Otherwise, the answer is no and method 600 proceeds to 634.

At 632, method 600 adjusts the trailer brake gain or a maximum amount of electric current that may be supplied to electrically operated trailer brakes via a trailer brake controller. In one example, a base trailer brake gain or a base maximum amount of electric current that may be supplied to the trailer brakes may be input to a trailer brake controller via an operator or human/machine interface. The base trailer brake gain or base maximum amount of electric current that may be supplied to trailer brakes may be adjusted via a controller (e.g., 12) as a function of μ and vehicle speed as expressed via the following equations:

$$T_{Brakegain}=T_{Brakegainold}+f(\mu, V_s)$$

$$I_{maxBR}=I_{maxold}+f(\mu V_s)$$

where $T_{Brakegain}$ is the new trailer brake gain value, $T_{Brakegainold}$ is the prior trailer brake gain value or the base trailer brake gain, f is a function that provides a numerical trailer brake gain adjustment value, μ is a coefficient of friction between the vehicle's tires and the road, and $V_s$ is vehicle speed, $I_{maxBR}$ is the maximum amount of electric current that may be delivered to the trailer brakes, $I_{maxold}$ is the prior maximum amount of electric current that may be delivered to the trailer brakes, and g is a function that provides a numerical adjustment value to the maximum amount of electric current that may be supplied to the trailer brakes. By adjusting the trailer brake gain as a function of μ, it may be possible to reduce the possibility of the trailer brakes locking on low μ surfaces so that regenerative braking and trailer towing stability may be improved.

The trailer brake gain may be reduced to zero during some vehicle operating conditions to maximize electric charge production and regenerative braking. Likewise, the maximum electric current that may be delivered to trailer brakes may be reduced to zero during some vehicle operating conditions to maximize electric charge production and regenerative braking.

Additionally, in some examples, the trailer brake gain or the maximum amount of electric current that may be provided to trailer brakes may be closed loop adjusted in response to output of the lateral, longitudinal, and vehicle stability controllers. For example, if during regenerative braking after the trailer brake gain value has been adjusted, the trailer brake gain or the maximum amount of electric current that may be provided to trailer brakes may be adjusted further in proportion to the output of summing junction 646. Thus, if the vehicle experiences longitudinal slip after the trailer brake gain has been reduced, the trailer brake gain or the maximum amount of electric current that may be provided to trailer brakes may be adjusted by adding the output of summing junction 646 multiplied by a scaling factor to the trailer brake gain or the maximum amount of electric current that may be provided to trailer brakes. Alternatively, a predetermined gain adjustment may be added to the present trailer brake gain or the maximum amount of electric current that may be provided to trailer brakes to improve vehicle stability control and regenerative braking. The trailer brakes are applied proportionately with brake pedal position up to the adjusted or new trailer brake gain level when the brake pedal is applied. Method 600 proceeds to exit.

At 634, method 600 adjusts or sets the trailer brake gain or the maximum amount of electric current that may be provided to trailer brakes to the base value that was selected by the vehicle's human driver. The vehicle's human driver may gradually increase the trailer brake gain or the maximum amount of electric current that may be provided to trailer brakes until the trailer brakes lock at a low vehicle speed while vehicle brakes are not applied and when the trailer brakes are applied. Once the trailer brakes lock at low vehicle speed the trailer brake gain or the maximum amount of electric current that may be provided to trailer brakes may be reduced a small amount so that the trailer brakes no longer lock at low vehicle speeds when the trailer brakes are applied without the vehicle brakes being applied. The trailer brake gain or the maximum amount of electric current that may be provided to trailer brakes may be manually set at the value where the trailer brakes do not lock on a base road surface (e.g., a flat dry road). The trailer brakes are applied proportionately with brake pedal position up to the maximum amount of electric current that may be provided to trailer brakes when the brake pedal is applied. Method 600 proceeds to exit.

Figure 7:
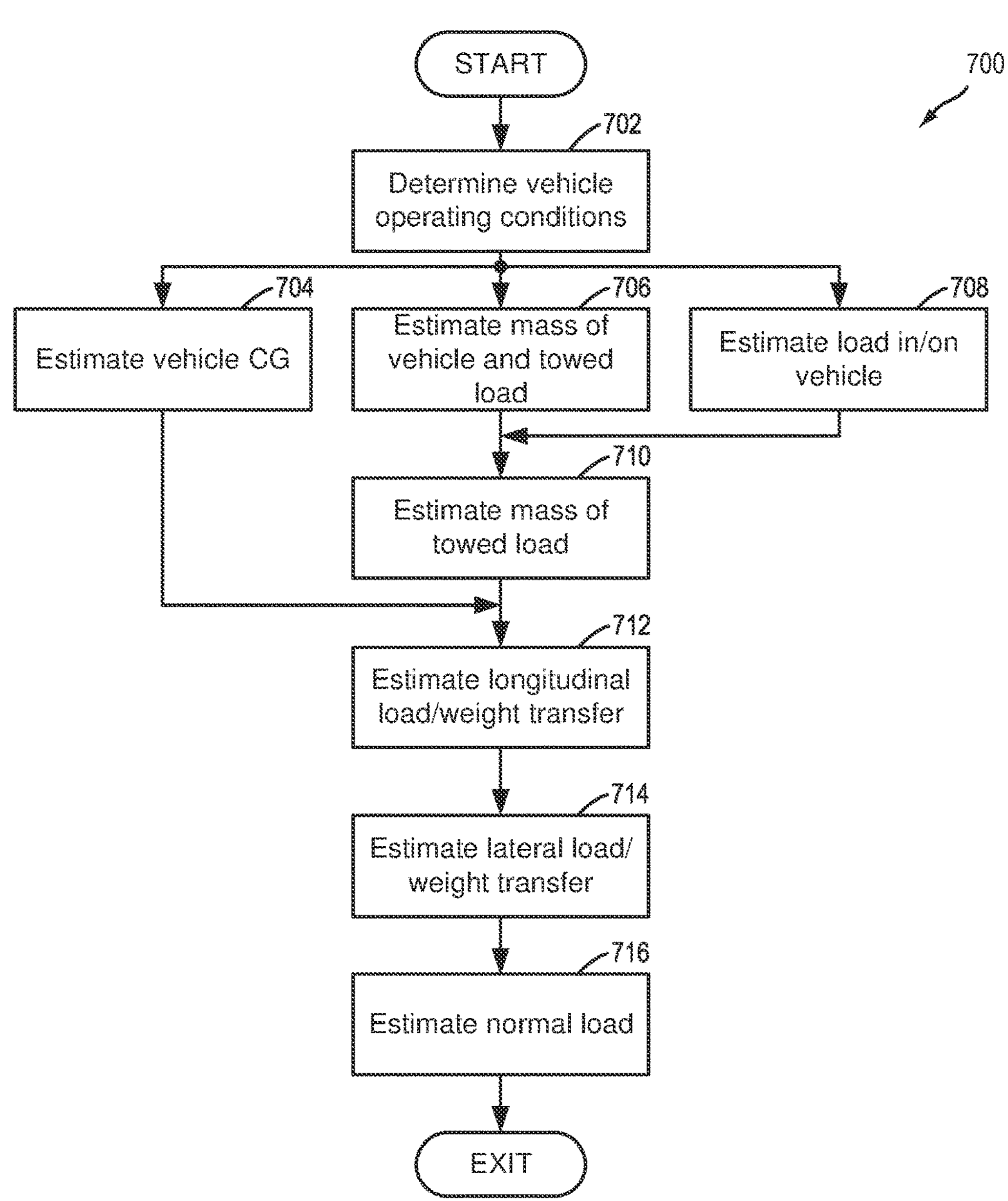

FIG. 7 shows a flowchart of a method 700 for estimating normal (e.g., perpendicular) load over a vehicle wheel is shown. Method 700 may be applied to each vehicle wheel. Method 700 may be used in conjunction with method 600 and the controllers of FIGS. 8-10.

At 702, method 700 determines vehicle operating conditions. Vehicle operating conditions may include, but are not limited to empty vehicle mass, empty vehicle center of gravity (CG) location, longitudinal/lateral/vertical vehicle rate of speed changes, roll rate, brake torque request, driver demand torque request, vehicle load estimate, tire radius, wheel base, and vehicle track width. Method 700 may retrieve some of the values for these variables from controller memory. Method 700 may determine values of other variables based on output from one or more vehicle sensors. For example, driver demand torque may be determined by referencing a table or function according to driver demand pedal position and vehicle speed. Method 700 proceeds to 704, 706, and 708.

At 704, method 700 estimates the vehicle's center of gravity (CG). In one example, method 700 integrates a value of rate of vehicle roll or vehicle roll rate to determine a vehicle roll angle. The vehicle roll angle and rate of lateral vehicle speed change are applied to reference a table or function. The table or function includes empirically determined CG values for the vehicle and the table or function outputs the vehicle's estimated CG. Method 700 proceeds to 712.

At 706, method 700 estimates the mass of the vehicle and the mass of the towed load (e.g., the mass of a trailer and its contents being towed by the vehicle). The mass of the vehicle and the mass of the towed load may be referred to as the gross train mass estimate. In one example, method 700 estimates the mass of the vehicle and the mass of the towed load via the following equation:

$$M_{v+t} = \frac{\frac{T_{DD+B}}{Tr}}{A_x}$$

where $M_{v+t}$ is the mass of the vehicle and the trailer, $T_{DD+B}$ is the driver demand torque plus vehicle braking torque, $T_r$ is the tire radius, and $A_x$ is the vehicle longitudinal rate of vehicle speed change. Method 700 proceeds to 710.

At 708, method 700 estimates the load in or on the vehicle. In other words, method 700 estimates the load that has been added to the vehicle. In one example, method 700 determines a height of the vehicle's suspension and the height may be converted into a mass by referencing a table or function that outputs a mass as a function of vehicle suspension height. Method 700 may apply height sensor data from each wheel to estimate the total load in or on the vehicle. The values from the four height sensors may reference a table or function that outputs a vehicle load estimate. Method 700 proceeds to 710.

At 710, method 700 estimates the mass of the towed load. In one example, method 700 estimates the mass of the towed load by subtracting the estimated load in or on the vehicle (e.g., determined at 708) and the empty vehicle mass not including the trailer mass (e.g., retrieved from controller memory) from the gross train mass estimate (e.g., determined at 706). Method 700 proceeds to 712 after estimating the mass of the towed load or the trailer.

At 710, method 700 estimates the longitudinal weight transfer for the vehicle. In one example, method 700 estimates the longitudinal weight transfer via the following equation:

$$\text{Long}_{wt} = \left((M_{Ev} + M_{Vl}) \cdot \frac{A_x}{g}\right) \cdot \frac{CG_H}{W_b}$$

where $A_x$ is the longitudinal vehicle weight transfer, $M_{Ev}$ is mass of the empty vehicle (e.g., retrieved from controller memory), $M_{Vl}$ is mass of the vehicle load (e.g., as determined at 708), $\text{Long}_a$ is the vehicle's rate of longitudinal speed change, g is the gravitational constant, $CG_H$ is the height of the vehicle's CG (e.g., as estimated at 704), and $W_b$ is the length of the vehicle's wheel base (e.g., retrieved from controller memory). Method 700 proceeds to 712.

At 712, method 700 estimates the lateral weight transfer for the vehicle. In one example, method 700 estimates the lateral weight transfer via the following equation:

$$\text{Lat}_{wt} = \left((M_{Ev} + M_{Vl}) \cdot \frac{A_y}{g}\right) \cdot \frac{CG_H}{T_w}$$

where $\text{Lat}_{wt}$ is the lateral vehicle weight transfer, $M_{Ev}$ is mass of the empty vehicle (e.g., retrieved from controller memory), $M_{Vl}$ is mass of the vehicle load (e.g., as determined at 708), $A_y$ is the vehicle's rate of lateral speed change, g is the gravitational constant, $CG_H$ is the height of the vehicle's CG (e.g., as estimated at 704), and $T_w$ is the length of the vehicle's track width (e.g., retrieved from controller memory). Method 700 proceeds to 714.

At 714, method 700 estimates the normal load on a vehicle wheel. In one example, method 700 estimates the normal load on a wheel via the following equation:

$$N_{wl} = V_a \cdot \left((M_{Ev} + M_{Vl}) \cdot \left(1 - \frac{W_{LodCG}}{W_b}\right) \cdot (1 - (W_{LatCG} \cdot T_w) + \text{Long}_{wt} + \text{Lat}_{wt})\right)$$

where $N_{wl}$ is the normal load estimate for a particular wheel (e.g., right rear wheel), $V_a$ is the rate of vertical vehicle speed change, $M_{Ev}$ is mass of the empty vehicle, $M_{Vl}$ is mass of the vehicle load, $W_{LodCG}$ is the longitudinal distance from the vehicle CG to particular wheel, $W_b$ is the length of the vehicle's wheel base, $W_{LatCG}$ is the lateral distance from the vehicle CG to the particular wheel, $T_w$ is the length of the vehicle's track width (e.g., distance between front wheels), $Long_{wt}$ is the longitudinal weight transfer of the vehicle (e.g., as determined at 712), and $Lat_{wt}$ is the lateral weight transfer of the vehicle (e.g., as determined at 714). Method 700 proceeds to exit.

Referring now to FIG. 8, a block diagram of a proportional/integral/derivative (PID) lateral slip controller 800 for a vehicle is shown. A lateral slip controller may be provided for each wheel that may be coupled to an electric machine, where the electric machine may provide regenerative braking. Thus, for four wheel drive vehicles, four lateral slip controllers may provide lateral slip corrections for four electric machines.

A lateral slip angle target value for a vehicle and an estimated lateral slip angle for the vehicle are input to lateral slip controller 800 at summing junction 802. In one example, the lateral slip angle target may be empirically determined and stored in a table or function that may be referenced by a coefficient of friction between vehicle tires and a road, vehicle speed, and steering angle. The lateral slip angle estimate may be determined via integrating the difference between measured vehicle yaw rate and target yaw rate as a function of time. The estimated lateral slip angle is subtracted from the target lateral slip angle at summing junction 802 and summing junction 802 outputs a lateral slip angle error.

The lateral slip angle error is input to proportional deadband block 804, integral deadband block 808, and derivative deadband block 812. Proportional deadband block 804 outputs the lateral slip angle error if the lateral slip angle error is greater than a threshold lateral slip angle error. Otherwise, proportional deadband block 804 outputs a value of zero. Integral deadband block 808 outputs the lateral slip angle error if the lateral slip angle error is greater than a threshold slip angle error. Otherwise, integral deadband block 808 outputs a value of zero. Derivative deadband block 812 outputs the lateral slip angle error if the lateral slip angle error is greater than a threshold slip angle error. Otherwise, derivative deadband block 812 outputs a value of zero.

At proportional gain block 806, the output of proportional deadband block 804 is multiplied by a proportional gain value (e.g., a scalar multiplier). Proportional gain block 806 provides output to summing junction 816. The output of integral deadband block 808 is integrated and multiplied by an integral gain value (e.g., a scalar multiplier). Integral gain block 810 provides output to summing junction 816. The derivative of the output of derivative deadband block 812 is multiplied by a derivative gain value (e.g., a scalar multiplier). Derivative gain block 814 provides output to summing junction 816. Summing junction 816 adds the output of proportional gain block 806, the output of integral gain block 810, and the output of derivative gain block 814 to generate a correction value. The correction value is output to block 818 and block 818 limits the rate of change of the output of summing junction 816. The rate limited correction value is output from rate limit block 818 and it is input to a filter (e.g., a first order low pass filter) at block 820. The filtered correction for lateral vehicle slip is output from block 820.

Figure 9:
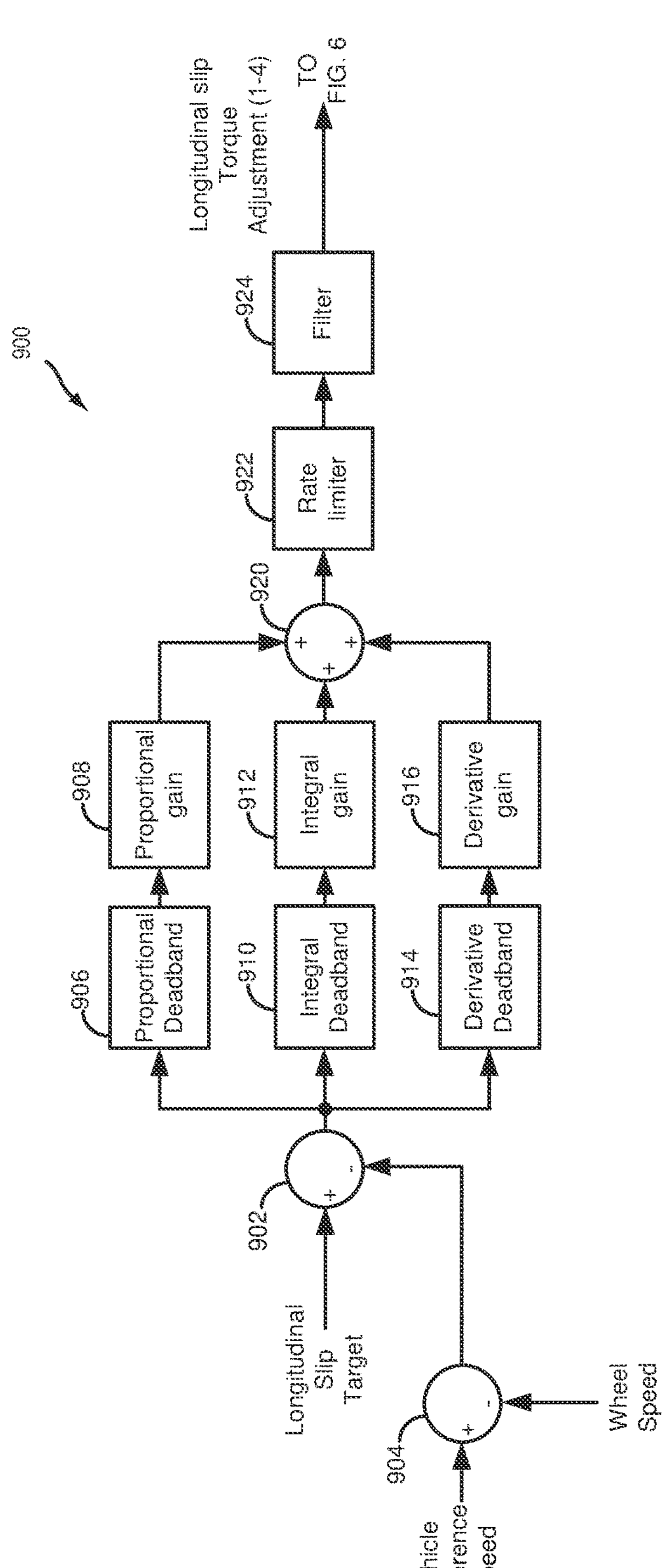

Referring now to FIG. 9, a block diagram of a proportional/integral/derivative (PID) longitudinal slip controller 900 for a vehicle is shown. A longitudinal slip controller may be provided for each wheel that may be coupled to an electric machine, where the electric machine may provide regenerative braking. Thus, for four wheel drive vehicles, four longitudinal slip controllers may provide longitudinal slip corrections for up to four electric machines.

A vehicle reference speed and wheel speed are input to longitudinal slip controller 900 at summing junction 904. In one example, the vehicle reference speed may be a function of four wheel speeds and a rate of vehicle longitudinal speed change multiplied by an amount of time between samples, which may be expressed as Vref=f(w1, w2, w3, w4, Ax·dt), where f is a function that returns the vehicle reference speed Vref, w1 is a first wheel speed, w2 is a second wheel speed, w3 is a third wheel speed, w4 is a fourth wheel speed, Ax if rate of vehicle longitudinal speed change, and dt is the amount of time between wheel speed samples. The wheel speed that is input to summing junction 904 is for the wheel which will be torque adjusted for longitudinal slip. The wheel speed is subtracted from the vehicle reference speed and the result is input to summing junction 902 as a vehicle speed error.

The vehicle speed error is subtracted from a longitudinal slip target value at summing junction 902. In one example, the longitudinal slip target may be empirically determined and stored in a table or function that may be referenced by a coefficient of friction between vehicle tires and a road, vehicle speed, and steering angle. The vehicle speed error is subtracted from the target longitudinal slip at summing junction 902 and summing junction 902 outputs a longitudinal slip error.

The vehicle longitudinal slip error is input to proportional deadband block 906, integral deadband block 910, and derivative deadband block 914. Proportional deadband block 906 outputs the longitudinal slip angle error if the longitudinal slip angle error is greater than a threshold slip angle error. Otherwise, proportional deadband block 906 outputs a value of zero. Integral deadband block 910 outputs the longitudinal slip angle error if the longitudinal slip angle error is greater than a threshold longitudinal slip angle error. Otherwise, integral deadband block 910 outputs a value of zero. Derivative deadband block 914 outputs the longitudinal slip angle error if the longitudinal slip angle error is greater than a threshold longitudinal slip angle error. Otherwise, derivative deadband block 914 outputs a value of zero.

At proportional gain block 908, the output of proportional deadband block 906 is multiplied by a proportional gain value (e.g., a scalar multiplier). Proportional gain block 908 provides output to summing junction 920. The output of integral deadband block 910 is integrated and multiplied by an integral gain value (e.g., a scalar multiplier) at integral gain block 912. Integral gain block 912 provides output to summing junction 920. The derivative of the output of derivative deadband block 914 is multiplied by a derivative gain value (e.g., a scalar multiplier) at derivative gain block 916. Derivative gain block 916 provides output to summing junction 920. Summing junction 920 adds the output of proportional gain block 908, the output of integral gain block 912, and the output of derivative gain block 916 to generate a correction value. The correction value is output to rate limit block 922 and rate limit block 922 limits the rate of change of the output of summing junction 920. The rate limited correction value is output from rate limit block 922 and it is input to a filter (e.g., a first order low pass filter) at block 924. The filtered correction for longitudinal vehicle slip is output from block 924.

Figure 10:
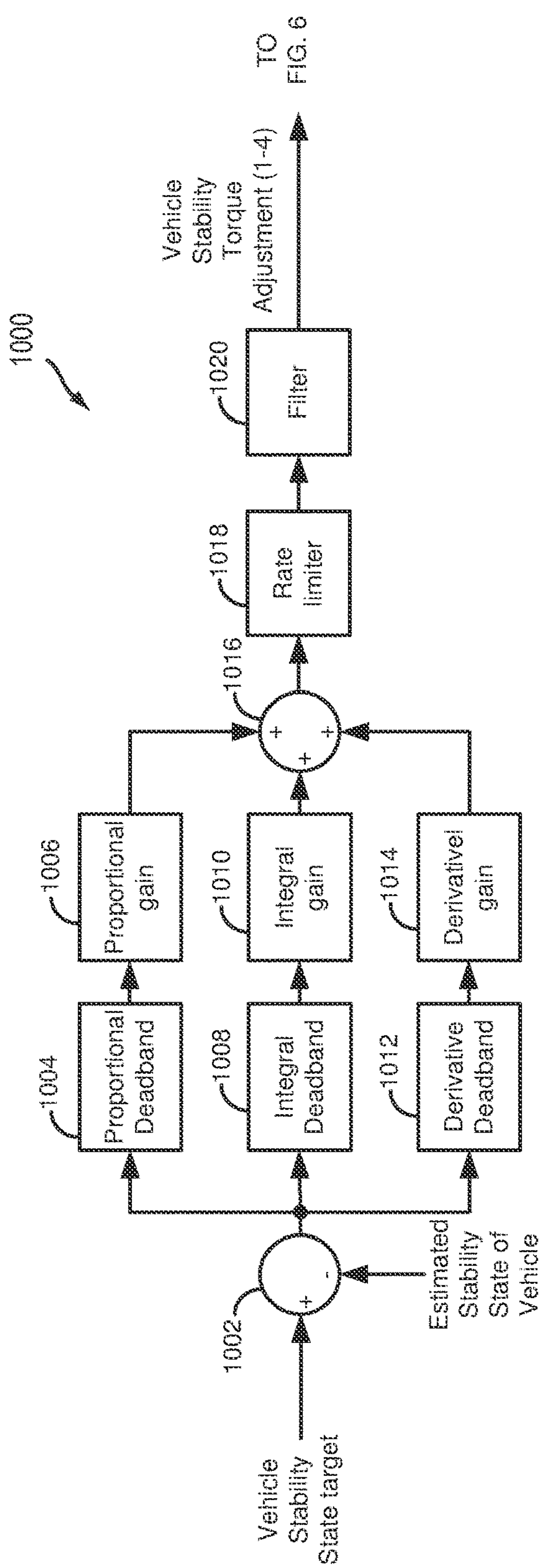

Referring now to FIG. 10, a block diagram of a proportional/integral/derivative (PID) vehicle stability controller 1000 is shown. A vehicle stability controller may be provided for each wheel that may be coupled to an electric machine, where the electric machine may provide regenerative braking. Thus, for four wheel drive vehicles, four vehicle stability controllers may provide lateral slip corrections up to for four electric machines.

A vehicle stability target value for a vehicle and an estimated vehicle stability state for the vehicle are input to vehicle stability controller 1000 at summing junction 1002. In one example, the vehicle stability target may be empirically determined and stored in a table or function that may be referenced by a coefficient of friction between vehicle tires and a road, vehicle speed, and steering angle. The vehicle stability estimate may be determined via output of one or more accelerometers, (yaw, pitch, and roll) rate sensors, wheelspeed sensors, and steering angle sensors. The estimated vehicle stability is subtracted from the target vehicle stability at summing junction 1002 and summing junction 1002 outputs a vehicle stability error.

The vehicle stability error is input to proportional deadband block 1004, integral deadband block 1008, and derivative deadband block 1012. Proportional deadband block 1004 outputs the vehicle stability error if the vehicle stability error is greater than a threshold vehicle stability error. Otherwise, proportional deadband block 1004 outputs a value of zero. Integral deadband block 1008 outputs the vehicle stability error if the vehicle stability error is greater than a threshold vehicle stability error. Otherwise, integral deadband block 1008 outputs a value of zero. Derivative deadband block 1012 outputs the vehicle stability error if the vehicle stability error is greater than a threshold vehicle stability error. Otherwise, derivative deadband block 1012 outputs a value of zero.

At proportional gain block 1006, the output of proportional deadband block 1004 is multiplied by a proportional gain value (e.g., a scalar multiplier). Proportional gain block 1006 provides output to summing junction 1016. The output of integral deadband block 1008 is integrated and multiplied by an integral gain value (e.g., a scalar multiplier). Integral gain block 1010 provides output to summing junction 1016. The derivative of the output of derivative deadband block 1012 is multiplied by a derivative gain value (e.g., a scalar multiplier). Derivative gain block 1014 provides output to summing junction 1016. Summing junction 1016 adds the output of proportional gain block 1006, the output of integral gain block 1010, and the output of derivative gain block 1014 to generate a correction value. The correction value is output to rate limit block 1018 and rate limit block 1018 limits the rate of change of the output of summing junction 1016. The rate limited correction value is output from rate limit block 1018 and it is input to a filter (e.g., a first order low pass filter) at block 1020. The filtered correction for vehicle stability is output from block 1020.

Thus, the method of FIGS. 6-10 provides for a vehicle operating method, comprising: adjusting regeneration torque (e.g., an amount of torque generated via an electric machine when the electric machine is operating as a generator and producing charge) of an electric machine via a controller in response to an estimated coefficient of friction between a tire and a road, a normal load on a wheel, a vertical rate of speed change of a vehicle, a longitudinal rate of speed change of the vehicle, and a lateral rate of speed change of the vehicle, where the tire is coupled to the wheel.

In a first example, the vehicle operating method further comprises multiplying the longitudinal rate of speed change of the vehicle with an estimate of mass of the vehicle that includes the wheel to estimate a first force. In a second example that may include the first example, the vehicle operating method further comprises multiplying the lateral rate of speed change of the vehicle with the estimate of mass of the vehicle that includes the wheel to estimate a second force. In a third example that may include one or both of the first and second examples, the vehicle operating method further comprises generating a square of the first force, generating a square of the second force, adding the square of the first force to the square of the second force to generate a first result, and generating a square root of the first result. In a fourth example that may include one or more of the first through third examples, the vehicle operating method further comprises subtracting the square root of the first result from the vertical rate of speed change of the vehicle to generate a second result. In a fifth example that may include the first through fourth examples, the vehicle operating further comprises multiplying the estimated coefficient of friction between tire and a road with the normal load on the wheel to generate a third result, and multiplying the third result with the second result. In a sixth example that may include the first through fifth examples, the vehicle operating method further comprises adjusting a trailer brake gain or the maximum amount of electric current that may be provided to trailer brakes in response to a difference between an available amount of regenerative braking and a requested amount of regenerative braking. In a seventh example that may include the first through sixth examples, the vehicle operating method further comprises adjusting the trailer brake gain or the maximum amount of electric current that may be provided to trailer brakes in response to output of at least one of a longitudinal slip controller, a lateral slip controller, and a vehicle stability controller.

The method of FIGS. 6-10 provides for a vehicle operating method, comprising: adjusting a trailer brake gain or the maximum amount of electric current that may be provided to trailer brakes via a controller in response to a requested regenerative braking amount. In a first example, the vehicle operating method further comprises delivering an amount of electric current to brakes of a trailer based on the trailer brake gain. In a second example that may include the first example, the vehicle operating method further comprises adjusting the trailer brake gain via the controller in response to an amount of available regenerative braking. In a third example that may include one or more of the first and second examples, the vehicle operating method further comprises adjusting the trailer brake gain via the controller in response to at least one of a lateral slip controller output, a longitudinal slip controller output, and a vehicle stability controller output while a brake pedal is applied. In a fourth example that may include one or more of the first through third examples, the vehicle operating method further comprises adjusting the trailer brake gain based on an estimated coefficient of friction between a tire and a road.

Note that the example control and estimation routines included herein can be used with various vehicle and powertrain configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to induction electric machines and permanent magnet electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:

adjusting regeneration torque of an electric machine via a controller in response to an estimated coefficient of friction between a tire and a road, a normal load on a wheel, a vertical rate of speed change of a vehicle, a longitudinal rate of speed change of the vehicle, and a lateral rate of speed change of the vehicle, where the tire is coupled to the wheel.

2. The vehicle operating method of claim 1, further comprising multiplying the longitudinal rate of speed change of the vehicle with an estimate of mass of the vehicle that includes the wheel to estimate a first force.

3. The vehicle operating method of claim 2, further comprising multiplying the lateral rate of speed change of the vehicle with the estimate of mass of the vehicle that includes the wheel to estimate a second force.

4. The vehicle operating method of claim 3, further comprising generating a square of the first force, generating a square of the second force, adding the square of the first force to the square of the second force to generate a first result, and generating a square root of the first result.

5. The vehicle operating method of claim 4, further comprising subtracting the square root of the first result from the vertical rate of speed change of the vehicle to generate a second result.

6. The vehicle operating method of claim 5, further comprising multiplying the estimated coefficient of friction between tire and a road with the normal load on the wheel to generate a third result, and multiplying the third result with the second result.

7. The vehicle operating method of claim 1, further comprising adjusting a trailer brake gain or a maximum trailer brake current in response to a difference between an available amount of regenerative braking and a requested amount of regenerative braking.

8. The vehicle operating method of claim 7, further comprising adjusting the trailer brake gain or the maximum trailer brake current in response to output of at least one of a longitudinal slip controller, a lateral slip controller, and a vehicle stability controller.

9. A vehicle system, comprising:

an electric machine coupled to a wheel; and a controller including executable instructions stored in non-transitory memory to operate the electric machine in a regenerative braking mode and to adjust a regenerative braking torque generated via the electric machine in response to a sum of a first torque adjustment and a second torque adjustment, the first torque adjustment based on a normal load on the wheel, and the second torque adjustment being generated via adding a torque adjustment generated via a lateral slip controller torque adjustment, a longitudinal slip controller torque adjustment, and a vehicle stability controller torque adjustment.

10. The vehicle system of claim 9, further comprising additional instructions to adjust a trailer brake gain or a maximum trailer brake current amount in response to a difference between an available amount of regenerative braking and a requested amount of regenerative braking.

11. The vehicle system of claim 10, further comprising additional instructions to adjust the trailer brake gain or the maximum trailer brake current amount in response to output of at least one of a longitudinal slip controller, a lateral slip controller, and a vehicle stability controller.

12. The vehicle system of claim 11, where adjusting the trailer brake gain or maximum trailer brake current amount includes decreasing the trailer brake gain or the maximum trailer brake current amount.

13. The vehicle system of claim 9, further comprising additional instructions to adjust an estimate of the normal load on the wheel based on an estimated center of gravity height.

14. The vehicle system of claim 13, further comprising additional instructions to adjust the estimate of the normal load on the wheel based on an estimated longitudinal weight transfer value.

15. The vehicle system of claim 14, further comprising additional instructions to adjust the estimate of the normal load on the wheel based on an estimated lateral weight transfer value.

16. A vehicle operating method, comprising:

adjusting a trailer brake gain or a maximum trailer brake current via a controller in response to a requested regenerative braking amount, and adjusting the trailer brake gain via the controller in response to at least one of a lateral slip controller output, a longitudinal slip controller output, and a vehicle stability controller output while a brake pedal is applied.

17. The vehicle operating method of claim 16, further comprising delivering an amount of electric current to brakes of a trailer based on the trailer brake gain.

18. The vehicle operating method of claim 16, further comprising adjusting the trailer brake gain via the controller in response to an amount of available regenerative braking.

19. The vehicle operating method of claim 16, further comprising adjusting the trailer brake gain based on an estimated coefficient of friction between a tire and a road.

* * * * *